Patented Feb. 18, 1947

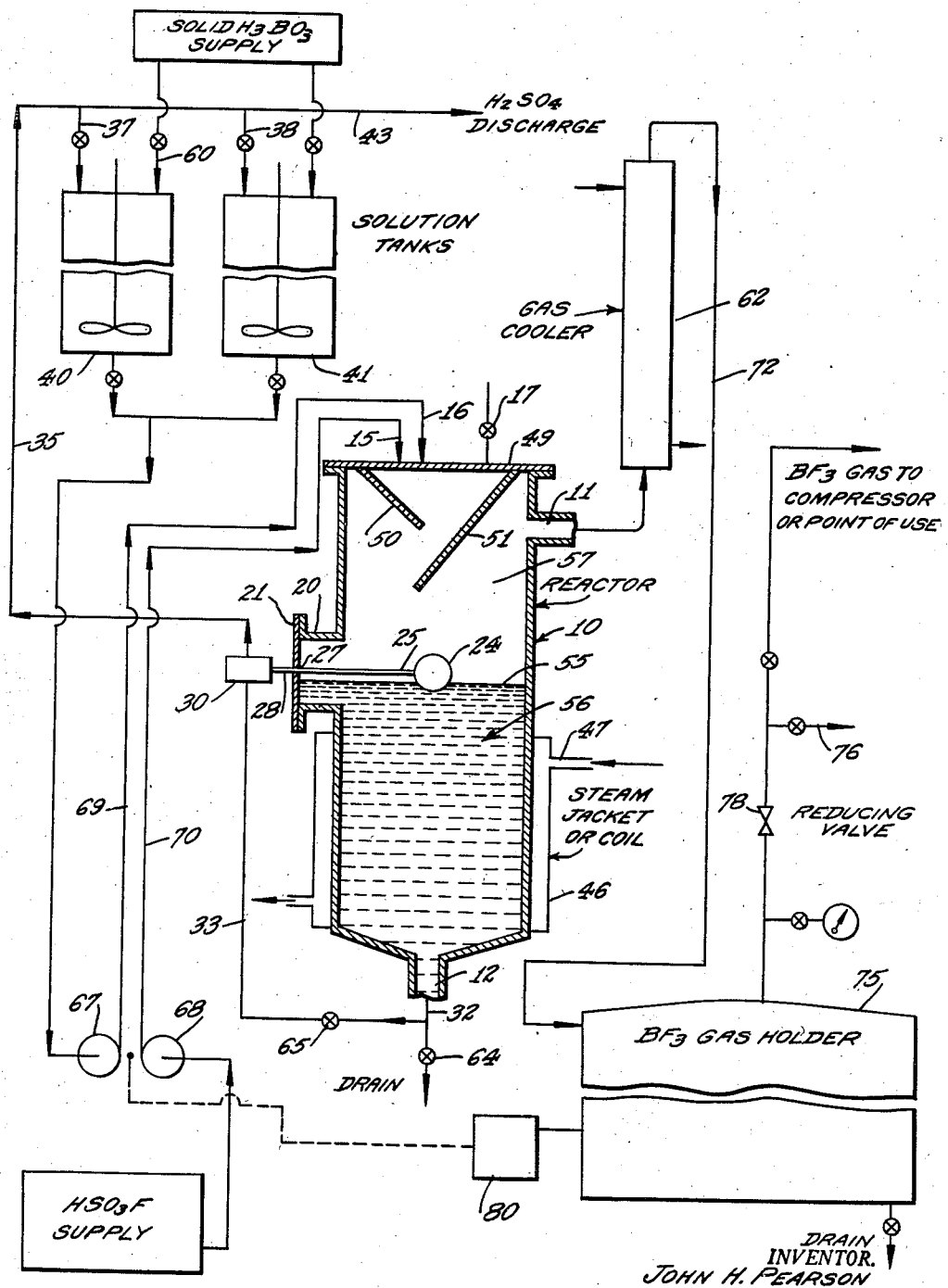

2,416,133

UNITED STATES PATENT OFFICE 2,416,133

MANUFACTURE OF BORON TRIFLUORIDE

De Walt Secrist Young, Kingsport, Tenn., and John H. Pearson, Manhasset, N. Y., assignors to General Chemical Company, New York, N. Y., a corporation of New York Application June 16, 1944, Serial No. 540,612

7 Claims. (Cl. 23—205)

This invention relates to manufacture of boron trifluoride.

Fluosulfonic acid ($HSO_3F$), and boric acid itself ($H_3BO_3$) or any of its dehydrated forms such as metaboric acid ($HBO_2$), pyroboric acid ($H_2B_4O_7$) and boric anhydride ($B_2O_3$), may be reacted to form $BF_3$ gas and liquid sulfuric acid as a by-product. This invention aims to provide a process for making $BF_3$ gas continuously and preferably under substantial superatmospheric pressure. Other major objects are to provide procedure by the practice of which it is possible to obtain high $BF_3$ gas yield by effecting rapid reaction of reactants and minimizing solubility of $BF_3$ in by-product sulfuric acid notwithstanding permissive relatively high pressures at which the process may be carried out. The preferred boron compound employed in carrying out the improved process is commercial solid boric acid ($H_3BO_3$), and the herein presented description of the invention is given mostly in connection with use of this material.

The invention, its objects and advantages may be more fully understood from the following description taken in connection with the accompanying drawing showing apparatus, partly in section and partly diagrammatic, in which a preferred embodiment of the process may be carried out.

Referring to the drawing, 10 indicates a vertically elongated reactor designed to withstand internal pressures of say 250–350 lbs. per square inch gauge. The reactor is made preferably of iron which term, in this specification and appended claims, is intended to include commonly known grades of steel. Near the upper end, the reactor is provided with a $BF_3$ gas outlet 11, and at the bottom with an outlet 12 thru which sulfuric acid by-product of the reaction may be discharged. Liquid fluosulfonic acid and sulfuric acid liquor containing boric acid in solution are pumped into the top of the reactor thru inlets at 15 and 16 respectively. A safety valve 17 is operatively associated with the gas space in the top of the reactor.

On one side of the reactor is a cylindrical extension 20, of substantial diameter, having a closure plate 21. The latter acts as a support for a float 24 the arm 25 of which is suitably fulcrumed as at 27. The outer end 28 of arm 25 controls a valve 30 which in turn regulates the quantity of liquid discharged from the reactor thru pipes 32 and 33. Liquor passing valve 30 is conducted by pipe 35 and valve-controlled connections 37 and 38 into solution make-up tanks 40 and 41 or to an outlet 43 from which excess by-product sulfuric acid may be discharged from the system.

While float 24 may be located conveniently at about the mid-point of the vertical height of the reactor, any other position is suitable so long as extension 20 and the float are placed so as to facilitate maintenance in the bottom of the reactor of a sulfuric acid liquid pool of substantial depth. Ordinarily such pool should fill the reactor to at least a third of its capacity. That portion of the lower section of the reactor occupied by the liquid pool is preferably entirely surrounded by a steam jacket or coil 46, the inlet 47 of which is connected to a source of steam under pressure.

Projecting downwardly from the reactor cover 49 are baffle plates 50 and 51 usually arranged as shown on the drawing. These plates may be replaced by any suitable mechanical means which promote good mixing of incoming fluosulfonic acid and sulfuric acid liquor containing boric acid in solution. For example, a grid support and loose tile packing may be employed in the top of the tower. Alternatively, fluosulfonic acid and sulfuric acid liquor containing boric acid in solution may be charged into the reactor at a common inlet point, in which case good mixing of reactants would be obtained initially and no mechanical mixing devices in the top of the reactor would be necessary. Thus the space between the surface 55 of the liquid pool 56 and the top of the reactor provides an unobstructed reaction zone 57, this term being used in the sense that, whether or not the upper end of the reactor contains baffles or other mechanical mixing and dispersing means, there is no impedance to rapid downflow of liquor, and that in reaction zone 57 there is nothing in the nature of an unbroken body of liquid as exists in the bottom of the reactor.

The fluosulfonic acid used may be commercial fluosulfonic acid ordinarily running in excess of 95% $HSO_3F$ and possibly containing some small amounts of $SO_3$ in solution. Also, redistilled fluosulfonic acid containing substantially no $SO_3$ may be employed. In starting up the process, one solution tank e. g. tank 40 is partly filled with commercial sulfuric acid of preferably 99–100% strength. Solid boric acid is run into tank 40 thru inlet 60 in quantity sufficient to provide, after agitation and dissolution of boric acid, a sulfuric acid liquor containing preferably not more than 25% by weight of $H_3BO_3$. Although boric acid concentration may be higher, we find that to insure smooth operation of the subsequent $HSO_3F$—$H_3BO_3$ reaction, the sulfuric acid liquor should contain not more than 25% by weight of $H_3BO_3$.

Ordinarily sulfuric acid liquors having boric acid concentrations of 20–25% are employed. When any of the dehydrated forms of $H_3BO_3$ are employed in place of or in conjunction with $H_3BO_3$, the quantities of other forms used are such as to provide boron concentrations equivalent to the boron concentrations when $H_3BO_3$ itself is utilized.

Steam is admitted to the jacket 46, and the reactor is brought up to temperature of about 100° C. Cold water is run into and thru the cooling chamber, not shown, of gas cooler 62. Valves 64 and 65 near the bottom of the reactor are closed.

Pumps 67 and 68 are started up, and sulfuric acid liquor containing boric acid in solution and fluosulfonic acid are fed into the top of the reactor thru pipes 69 and 70 respectively. Boric acid and fluosulfonic acid react in accordance with the equation $H_3BO_3 + 3HSO_3F \rightarrow BF_3 + 3H_2SO_4$ to form $BF_3$ gas and by-product sulfuric acid. The gas produced leaves the reactor thru outlet 11, passes thru cooler 62, line 72 into gas holder 75 and preliminarily may be disposed of thru an outlet connection 76. Liquor comprising the sulfuric acid used in the make-up tank 40 plus the sulfuric acid by-product of the boric acid-fluosulfonic acid reaction collects in the bottom of the reactor. The foregoing procedure is followed until the liquor in the reactor rises to approximately the level 55, and until the system is purged of air. Thereafter, the valve in line 76 is closed, and reducing valve 78 is adjusted to create in gas holder 75 and the reactor whatever gas pressure is desired for operation.

When liquor level in the reactor rises sufficiently to contact float 24, valve 65 is opened wide and then the float controls valve 30 which, in conjunction with the float, is adjusted so as to maintain the surface of the liquid pool 56 at approximately constant level. In the succeeding normal operation of the process, sulfuric acid liquor is forced by the pressure existing in the reactor thru pipe 33, valve 30, and pipe 35 either into make-up tanks 40 and 41 or to the point of discharge at 43. In tanks 40 and 41 sulfuric acid liquors, containing boric acid in solution, of the type previously described are continuously made up as before except that by-product sulfuric acid is used in place of fresh commercial acid.

While the process of this invention may be used to form $BF_3$ gas under any appreciable superatmospheric pressure as low as say 3–5 lbs. gauge, a major feature of the present improvements lies in continuous production of $BF_3$ gas at relatively high pressures, e. g. 70–250 lbs. gauge. An important use of $BF_3$ is as a catalyst in various chemical processes operated under pressures of the order of 100–200 lbs. This invention provides a process which, for example, may be carried out by a user of $BF_3$ to produce $BF_3$ gas at an elevated pressure the same as or above the pressure existing in the process in which the $BF_3$ is to be employed. Thus $BF_3$ gas made under pressure in accordance with the process of this invention may be fed directly to another pressure process using $BF_3$ as a reactant or catalyst. Further, for general sales purposes, $BF_3$ gas is stored and transported in cylinders under very high pressures of 1800 to 2000 lbs. gauge. Formation of $BF_3$ at the high pressures attainable by the present process has the advantage of reducing gas compression costs even in instances in which the gas is to be stored in cylinders. These advantages are accomplished by utilizing the energy of the $H_3BO_3$—$HSO_3F$ reaction as a compression agent, and arise from the discovery of certain operating conditions which offset the materially reduced yields characterizing processes in which a sought-for product is a gas.

In developing a continuous process of this nature, some of the principal operating problems encountered comprised (a) mode of feed of boric acid (commercially a solid material) to the reaction zone, (b) provision of a major reaction zone of such nature as to afford intimate contact of reactants while in their most concentrated condition, ready separability of $BF_3$ gas and by-product sulfuric acid, and substantially immediate removal of liquid from the zone of major reaction, to thereby make possible a high rate of reaction and cut down opportunity for sulfuric acid to absorb or dissolve $BF_3$, (c) reduction of solubility of $BF_3$ gas in the sulfuric acid discharged from the reactor, (d) selection of materials out of which the reactor and associated equipment may be made, and (e) minimization of $SO_2$ content of $BF_3$ gas produced.

In practice of the process, particularly when working at relatively low pressures of less than about 20 lbs. gauge, it is possible to feed $H_3BO_3$ in solid form into the reactor. However, such procedure even at relatively low pressures gives rise to difficulties, in regard to proper proportioning of the amounts of reactants supplied to the reaction zone and to securing satisfactory dispersion and intimate contact of liquid fluosulfonic acid and solid $H_3BO_3$. Accordingly, in all modifications of the process it is preferred to supply boric acid to the reaction zone while in solution in sulfuric acid, since this procedure facilitates introduction of boric acid against any pressure which may be prevailing in the reaction zone, and permits accurate reactant proportioning which is an important factor of successful operation. Moreover, utilization of sulfuric acid as a boric acid carrier avoids introduction into the reaction zone of any ingredient or impurity other than sulfuric acid, a material necessarily formed as a result of the $H_3BO_3$—$HSO_3F$ reaction itself. Additionally, we find that sulfuric acid liquors containing the preferred 20–25% by weight concentration of $H_3BO_3$ are of satisfactory viscosity and are readily amenable to handling in a proportioning pump. Also, introduction of boric acid in liquid carrier affords good dispersion of boric acid and adequate mixing with fluosulfonic acid.

We have discovered that intimate contact of reactants while in the most concentrated condition, ready separability of $BF_3$ gas and by-product sulfuric acid, and substantially immediate removal of liquid from the area of major reaction may be had by introducing the fluosulfonic acid and the sulfuric acid liquor containing boric acid in solution into an unobstructed reaction zone. In the embodiment under consideration, temperatures may be as low as 50–80° C., particularly in the top of reaction zone 57. Notwithstanding such low reaction temperatures, which contribute to corrosion reduction, our investigations show that on introduction of the fluosulfonic acid and the sulfuric acid liquor containing boric acid in solution into an unobstructed zone, the $HSO_3F$ and $H_3BO_3$ reaction is substantially a flash operation and immediately progresses to about 70–90% completion. In this circumstance, rapidity of separation of $BF_3$ gas from by-product sulfuric acid, and substantially immediate removal of liquid from the zone of major reaction are predominating features with respect to promoting a high rate of reaction and minimization of the opportunity for sulfuric acid to dissolve $BF_3$. These ends may be accomplished by utilization of an unobstructed reaction zone.

Investigations carried out during development of the invention show that $BF_3$ gas is markedly less soluble in sulfuric acid containing $HSO_3F$ than in sulfuric acid containing $H_3BO_3$. For example, at temperature of 30° C. and atmospheric pressure, sulfuric acid containing 1.9% $H_3BO_3$ (by weight) contained 5.1% $BF_3$, while on the other hand sulfuric acid containing 2.2% $HSO_3F$ contained only 1.9% $BF_3$. At temperature of 100° C. and atmospheric pressure, sulfuric acid containing 4.3% $H_3BO_3$ contained 6.1% $BF_3$, while sulfuric acid containing as much as 8% $HSO_3F$ contained only 0.9% $BF_3$. At temperature of 100° C. and pressure of 200 lbs. gauge, sulfuric acid containing 3.9% $H_3BO_3$ contained 9.7% $BF_3$, and sulfuric acid containing as much as 12.5% $HSO_3F$ contained only 1.3% $BF_3$.

It has also been found that as the $H_3BO_3$ content of a sulfuric acid liquor increases, the solubility of $BF_3$ also increases. Thus, at temperature of 30° C. and atmospheric pressure, sulfuric acid containing 1.9% $H_3BO_3$ contained 5.1% $BF_3$, and sulfuric acid liquor containing 4.6% $H_3BO_3$ contained 9.4% $BF_3$. At temperature of 100° C. and atmospheric pressure, sulfuric acid liquor containing 1.9% $H_3BO_3$ contained 2.9% $BF_3$, while at the same temperature and pressure conditions when the $H_3BO_3$ content was 4.4%, soluble $BF_3$ increased to 6.1%. In the case of sulfuric acid containing fluosulfonic acid, as $HSO_3F$ content increases, solubility of $BF_3$ decreases. At temperature of 30° C. and atmospheric pressure, a sulfuric acid containing 2.2% $HSO_3F$ contained 1.9% $BF_3$, but when the $HSO_3F$ content was increased to as much as 13.8%, solubility of $BF_3$ dropped to 1.5%. At temperature of 100° C. and atmospheric pressure, sulfuric acid liquor containing 8% $HSO_3F$, contained only 0.9% $BF_3$, and at temperature of 100° C. and pressure of 200 lbs. gauge, sulfuric acid liquor containing 12.5% $HSO_3F$ contained only 1.3% $BF_3$.

Further, it has been found that solubility of $BF_3$ in sulfuric acid containing some $HSO_3F$ is appreciably less than the solubility of $BF_3$ in straight sulfuric acid, i. e. sulfuric acid containing no $H_3BO_3$ or $HSO_3F$. At temperature of 30° C. and atmospheric pressure, straight sulfuric acid contained 2.7% dissolved $BF_3$, while sulfuric acid containing 2.2% $HSO_3F$, contained 1.9% $BF_3$. At temperature of 100° C. and atmospheric pressure, straight sulfuric acid contained 1.1% dissolved $BF_3$, while sulfuric acid containing as much as 8% $HSO_3F$ contained only 0.9% $BF_3$. At temperature of 100° C. and pressure of 200 lbs. gauge, straight sulfuric acid dissolved 3.1% $BF_3$, but sulfuric acid liquor containing as much as 12.5% $HSO_3F$ contained only 1.3% $BF_3$.

Accordingly, in practice of the present invention the quantities of $H_3BO_3$ and $HSO_3F$ fed to the reaction zone are such that the by-product sulfuric acid contains no $H_3BO_3$. While reasonably good results with respect to low solubility of $BF_3$ in by-product sulfuric acid may be obtained by feeding to the reaction zone $H_3BO_3$ and at least a stoichiometrically reacting proportion of fluosulfonic acid, it is preferred to supply the reaction zone with $HSO_3F$ in quantity in excess of that reacting stoichiometrically with $H_3BO_3$, so as to assure the presence of some $HSO_3F$ in the by-product sulfuric acid in the bottom of the reactor. In the usual practice of the preferred embodiments, proportioning pumps 67 and 68 are adjusted so as to feed to reaction zone 57 fluosulfonic acid and boric acid in an $HSO_3F:H_3BO_3$ weight ratio of not less than 5:1.

Another factor of importance in supplying heat to the major reaction zone, effecting rapidity of reaction therein, and in reducing loss of dissolved $BF_3$ in the by-product sulfuric acid discharged from the process is the temperature at which the sulfuric acid pool in the bottom of the reactor is held. Such temperature should be not less than 85° C. Some heat is developed during the $H_3BO_3$—$HSO_3F$ reaction, and to keep the sulfuric acid in the bottom of the reactor at proper temperature, only a relatively small amount of extraneous heat in the medium of steam supplied to jacket 46 is necessary. As previously noted, temperatures in the unobstructed reaction zone are materially less, usually of the order of 70–80° C., and in the top of such reaction zone, at approximately the point of introduction of fluosulfonic acid and sulfuric acid liquor containing boric acid in solution, temperature may be locally as low as 50° C. in the area where most of the $BF_3$ gas is formed. In general practice of the process, pool temperatures in excess of say 125–135° C. afford no worthwhile operating advantage.

It has been found that the process may be most satisfactorily and economically carried out in an iron or steel reactor, other accessory equipment being made of the same material. In most processes in which $BF_3$ gas is used as a reactant or catalyst, the presence of $SO_2$ in the gas is objectionable. In this connection it has been demonstrated that, when using iron or steel apparatus, in order to hold the $SO_2$ content of the $BF_3$ product gas to a desirable minimum, e. g. not more than 1%, and preferably substantially less, temperature of the pool of by-product sulfuric acid in the bottom of the reactor should be held not in excess of 105° C. Thus, temperature of pool 56 may be kept at 95–105° C., and the preferred working temperatures are 95–100° C. Maintenance of the desired pool temperatures may be had by adjustment of the pressure of the steam supplied to jacket 46. Preferably, the heating jacket or coils surround substantially the entire circumference of pool 56 to facilitate the relatively close temperature control indicated. In situations in which iron or steel apparatus is employed, and relatively high $SO_2$ content in the product gas is permissible, pool temperatures higher than 105° C. may be employed, although temperatures above 125–135° C. provide no important operating advantage.

In all embodiments of the invention, procedure is such as to maintain in the bottom of the reactor a heated liquid pool of substantial depth, e. g. one fourth to one half the depth of the reactor, this feature likewise contributing to high yield and low solubility of $BF_3$ in the sulfuric acid. It is preferred to control rate of discharge of liquid so as to hold each increment of liquid in the reactor for not less than four minutes. In usual practice of the preferred embodiments described, this result may be obtained by adjusting rate of liquor discharge so that the volume of liquid withdrawn per unit of time does not exceed, and is preferably a little less than, the volume of liquid charged into the reactor.

Product gas leaving the reactor passes upwardly thru cooler 62 in which the gas stream is cooled down to temperature of about 40° C. in order to condense out any sulfuric acid vapor and catch any mist. The gas stream then passes into holder 75 in which the gas is held at any desired working pressure, preferably 70 lbs. gauge or more, in accordance with the adjustment of reducing valve 78. If desired the apparatus may be provided with an automatic switch 80, controlled by gas pressure in holder 75, adjustable to start proportioning pumps 67 and 68 on a decrease of pressure in holder 75 below the given amount, and stop such pumps when pressure in holder 75 exceeds a given amount.

In representative operations summarized in the table below, the raw materials employed were solid technical boric acid containing 99% $H_3BO_3$, and commercial fluosulfonic acid containing 95.6% $HSO_3F$ and about 3% free $SO_3$. The boric acid was dissolved in by-product sulfuric acid to form a liquor having a $H_3BO_3$ concentration of 22% by weight. The operations were carried out continuously in a reactor similar to that shown in the drawing. By-product sulfuric acid was withdrawn from the reactor at a rate such that the volume of liquid withdrawn was about equal to or a little less than the volume of reactants charged, which rate permitted retention time of all liquid for more than four minutes.

| Run | Excess of $HSO_3F$ | Duration of run | Aver. temp. | Pressure | $SO_2$ in product gas | Yield from $HSO_3F$ |
|---|---|---|---|---|---|---|
| | Per cent | Minutes | °C. | P. s. i. g. | Per cent | Per cent |
| 1 | 2.0 | 45 | 92 | 20 | 0.31 | 84.9 |
| 2 | 0.4 | 50 | 90 | 70 | 1 0.30 | 86.3 |
| 3 | 3.2 | 45 | 90 | 70 | 0.13 | 84.1 |
| 4 | 1.7 | 65 | 105 | 70 | 0.62 | 86.0 |
| 5 | 3.1 | 45 | 105 | 70 | 0.43 | 89.5 |

1 Also contained 0.38% $SO_3$.

The by-product sulfuric acid residue of the above operations averaged 95.5% $H_2SO_4$, and 3% fluorine, or 3.5% calculated as $BF_3$.

In the appended claims, the term boric acid is intended to include $H_3BO_3$ itself and any of its more or less dehydrated forms.

We claim:

1. In the manufacture of boron trifluoride by reaction of boric acid and fluosulfonic acid to form $BF_3$ gas and by-product sulfuric acid, the steps comprising introducing fluosulfonic acid and a liquid comprising sulfuric acid containing boric acid into a reaction zone in a closed reactor, controlling introduction of said fluosulfonic acid and of said liquor so as to supply to said zone boric acid and at least a stoichiometrically reacting proportion of fluosulfonic acid, rapidly mixing the boric and fluosulfonic acids in said reaction zone so that $BF_3$ gas and liquid by-product sulfuric acid are rapidly formed, discharging $BF_3$ gas from said reaction zone, and discharging sulfuric acid from said reactor.

2. In the manufacture of boron trifluoride by reaction of boric acid and fluosulfonic acid to form $BF_3$ gas and by-product sulfuric acid, the steps comprising continuously forming a liquor comprising sulfuric acid containing boric acid, continuously maintaining in the bottom of a closed reactor a liquid pool comprising by-product sulfuric acid held at temperature of 85–135° C., continuously introducing a stream of said liquor and a stream of fluosulfonic acid into a reaction zone above said pool, controlling introduction of fluosulfonic acid and of said liquor so as to supply to said zone boric acid and at least a stoichiometrically reacting proportion of fluosulfonic acid, rapidly mixing the boric and fluosulfonic acids in said reaction zone so that $BF_3$ gas and liquid by-product sulfuric acid are rapidly formed, continuously withdrawing $BF_3$ gas from said reaction zone, and continuously discharging liquid from said pool at a rate such as to maintain said pool at a substantial depth.

3. In the manufacture of boron trifluoride by reaction of boric acid and fluosulfonic acid to form $BF_3$ gas and by-product sulfuric acid, the steps comprising continuously forming a liquor comprising sulfuric acid containing boric acid, continuously maintaining in the bottom of a closed reactor a liquid pool comprising by-product sulfuric acid held at temperature of 85–105° C., continuously introducing a stream of said liquor and a stream of fluosulfonic acid into a reaction zone above said pool, controlling introduction of fluosulfonic acid and of said liquor so as to supply to said zone fluosulfonic acid and boric acid in $HSO_3F:H_3BO_3$ weight ratio of not less than 5:1, rapidly mixing the boric and fluosulfonic acids in said reaction zone so that $BF_3$ gas and liquid by-product sulfuric acid are rapidly formed, continuously withdrawing $BF_3$ gas from said reaction zone, and continuously discharging liquid from said pool at a rate controlled to retain each increment of liquid within the reactor for not less than four minutes.

4. In the manufacture of boron trifluoride by reaction of boric acid and fluosulfonic acid to form $BF_3$ gas and by-product sulfuric acid, the steps comprising continuously forming from solid boric acid and sulfuric acid by-product of a previous operation a liquor containing 20–25% $H_3BO_3$ by weight, continuously maintaining in the bottom of a closed iron reactor a liquid pool comprising by-product sulfuric acid held at temperature of 85–105° C., continuously introducing a stream of said liquor and a stream of fluosulfonic acid into a reaction zone above said pool, controlling introduction of fluosulfonic acid and of said liquor so as to supply to said zone fluosulfonic acid and boric acid in $HSO_3F:H_3BO_3$ weight ratio of not less than 5:1, rapidly mixing the boric and fluosulfonic acids in said reaction zone so that $BF_3$ gas and liquid by-product sulfuric acid are rapidly formed, continuously withdrawing $BF_3$ gas from said reaction zone at a rate such as to maintain the gas thus withdrawn and in said zone under pressure not less than 70 lbs. gauge, and continuously discharging liquid from said pool at a rate controlled to retain each increment of liquid within the reactor for not less than four minutes.

5. In the manufacture of boron trifluoride by reaction of boric acid and fluosulfonic acid to form $BF_3$ gas and by-product sulfuric acid, the steps comprising continuously maintaining in the bottom of a closed reactor a liquid pool comprising by-product sulfuric acid held at temperature of 85–135° C., continuously introducing boric acid and at least a stoichiometrically reacting proportion of fluosulfonic acid into a reaction zone above said pool, rapidly mixing the boric and fluosulfonic acids in said reaction zone so that $BF_3$ gas and liquid by-product sulfuric acid are rapidly formed, continuously discharging $BF_3$ gas from said reaction zone, collecting liquid by-product sulfuric acid in said pool, and continuously discharging liquid from said pool at a rate such as to retain each increment of liquid within the reactor for not less than four minutes.

6. In the manufacture of boron trifluoride by reaction of boric acid and fluosulfonic acid to form BF₃ gas and by-product sulfuric acid, the steps comprising continuously maintaining in the bottom of a closed reactor a liquid pool comprising by-product sulfuric acid held at temperature of 85–135° C., continuously introducing fluosulfonic acid and boric acid in HSO₃F:H₃BO₃ weight ratio of not less than 5:1 into a reaction zone above said pool, rapidly mixing the boric and fluosulfonic acids in said reaction zone so that BF₃ gas and liquid by-product sulfuric acid are rapidly formed, continuously discharging BF₃ gas from said reaction zone, collecting liquid by-product sulfuric acid in said pool, and continuously discharging liquid from said pool at a rate such as to retain each increment of liquid within the reactor for not less than four minutes.

7. In the manufacture of boron trifluoride by reaction of boric acid and fluosulfonic acid to form BF₃ gas and by-product sulfuric acid, the steps comprising continuously maintaining in the bottom of a closed reactor a liquid pool comprising by-product sulfuric acid, continuously introducing boric acid and at least a stoichiometrically reacting proportion of fluosulfonic acid into a reaction zone above said pool, rapidly mixing the boric and fluosulfonic acids in said reaction zone so that BF₃ gas and liquid by-product sulfuric acid are rapidly formed, continuously discharging BF₃ gas from said reaction zone, collecting liquid by-product sulfuric acid in said pool, and continuously discharging liquid from said pool at a rate such as to maintain said pool at a substantial depth.

DE WALT SECRIST YOUNG.
JOHN H. PEARSON.

REFERENCES CITED

The following references are of record in the file of this patent:

UNITED STATES PATENTS

| Number | Name | Date |
| --- | --- | --- |
| 1,898,532 | Hardtmann et al. | Feb. 21, 1933 |